(12) United States Patent
Hwang et al.

(10) Patent No.: US 11,340,462 B2
(45) Date of Patent: May 24, 2022

(54) ELECTRONIC DEVICE

(71) Applicant: LG ELECTRONICS INC., Seoul (KR)

(72) Inventors: Changkyu Hwang, Seoul (KR); Seungyong Shin, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 287 days.

(21) Appl. No.: 16/489,664

(22) PCT Filed: Jun. 13, 2019

(86) PCT No.: PCT/KR2019/007122
§ 371 (c)(1),
(2) Date: Aug. 28, 2019

(87) PCT Pub. No.: WO2020/251083
PCT Pub. Date: Dec. 17, 2020

(65) Prior Publication Data
US 2021/0333559 A1    Oct. 28, 2021

(51) Int. Cl.
*G02B 27/01* (2006.01)
(52) U.S. Cl.
CPC ..... *G02B 27/0176* (2013.01); *G02B 27/0179* (2013.01); *G02B 2027/0178* (2013.01)
(58) Field of Classification Search
CPC ............. G02B 27/017; G02B 27/0176; G02B 27/0178
See application file for complete search history.

(56) References Cited

U.S. PATENT DOCUMENTS

| 2016/0103325 A1* | 4/2016 | Mirza ................. H04N 5/2253 348/335 |
| 2016/0341967 A1 | 11/2016 | Kaji et al. |
| 2018/0217380 A1* | 8/2018 | Nishimaki ......... G02B 27/0176 |

FOREIGN PATENT DOCUMENTS

| JP | 2016031504 | 3/2016 |
| JP | 2017211674 | 11/2017 |

(Continued)

OTHER PUBLICATIONS

PCT International Application No. PCT/KR2019/007122, International Search Report dated Mar. 11, 2020, 2 pages.

*Primary Examiner* — Alexander Eisen
*Assistant Examiner* — Cory A Almeida
(74) *Attorney, Agent, or Firm* — Lee, Hong, Degerman, Kang & Waimey PC

(57) ABSTRACT

The present invention relates to an electronic device. More particularly, the present invention relates to an electronic device used in virtual reality (VR), augmented reality (AR), mixed reality (MR), etc.

Disclosed herein is an electronic device including: a frame including at least one opening; a control unit fixed to the frame and generating an image; and an optical display unit positioned at the opening of the frame and receiving the image from the control unit and emitting the received image, in which the frame includes a front frame including the at least one opening and extending in a first horizontal direction and first and second side frames which is extended in a second direction crossing the front frame and are fixed at both ends of the front frame, and the first and second side frames parallel to each other, and the control unit has a structure in which a location of the control unit is adjusted on the any one of the first and second side frames so that the (Continued)

location of the image provided from the control unit and shown on the optical display unit is changed.

9 Claims, 8 Drawing Sheets

(56) References Cited

FOREIGN PATENT DOCUMENTS

| KR | 1020140090549 | 7/2014 |
| KR | 1020170003892 | 1/2017 |

* cited by examiner (a)                                              (b)

(a)

(b)

(c)

(d)

(e)

(f)

(a)

(b)

(a)

(a)

(b)

(a)

(b)

ELECTRONIC DEVICE

CROSS-REFERENCE TO RELATED APPLICATIONS

This application is the National Stage filing under 35 U.S.C. 371 of International Application No. PCT/KR2019/007122, filed on Jun. 13, 2019, the contents of which are hereby incorporated by reference herein in its entirety.

TECHNICAL FIELD

The present invention relates to an electronic device. More particularly, the present invention relates to an electronic device used in virtual reality (VR), augmented reality (AR), mixed reality (MR), etc.

BACKGROUND ART

Virtual reality (VR) refers to a specific environment or situation which is similar to reality created by artificial technology using a computer, etc., but is not reality or the technology itself.

Augmented reality (AR) refers to technology that combines a virtual object or information with a real environment to make it look like an object in an original environment.

Mixed reality (MR) or hybrid reality refers to technology that combines a virtual world and a real world to make a new environment or new information. In particular, an interaction between in objects which exist in reality and virtuality in real time is referred to as the mixed reality.

In this case, a created virtual environment or situation stimulates five senses of a user and makes spatial and temporal experiences similar to the reality, thereby making the user freely enter a boundary between the reality and imagination. Further, the user is capable of interacting with objects implemented in such an environment, such as giving an operation or a command by using a device which actually exists in addition to immersion in such an environment.

In recent years, a research into a gear used in such a technical field has been actively conducted.

DISCLOSURE

Technical Problem

An embodiment of the present invention provides an electronic device used in virtual reality (VR), augmented reality (AR), mixed reality (MR), etc.

More specifically, an embodiment of the present invention provides an electronic device that allows a user to view an optimal image at a more comfortable position by causing the position of an image to be viewed on an optical display unit to be changed.

Technical Solution

According to an example of the present invention, an electronic device includes: a frame including at least one opening; a control unit fixed to the frame and generating an image; and an optical display unit positioned at the opening of the frame and receiving the image from the control unit and emitting the received image, in which the frame includes a front frame including the at least one opening and extending in a first horizontal direction and first and second side frames which is extended in a second direction crossing the front frame and are fixed at both ends of the front frame, and the first and second side frames parallel to each other, and the control unit has a structure in which a location of the control unit is adjusted on the any one of the first and second side frames so that the location of the image provided from the control unit and shown on the optical display unit is changed.

The control unit may include a guide lens transferring the generated image to the optical display unit, and the optical display unit may include an incident area on which the image is incident through the guide lens and an emission area from which the image is emitted, which are positioned to face the end of the guide lens.

An upper portion of the any one of the first and second side frames at which the control unit is positioned may include a frame guide hole which is extended in the first horizontal direction and has a curve.

A housing in which the control unit is embedded may be provided in the any one of the first and second side frames at which the control unit is positioned, and the housing may have a housing protrusion inserted into the frame guide hole.

Here, as the housing protrusion moves along the frame guide hole, the control unit may pivot and rotate around the incident area of the optical display unit along planes formed in the first and second horizontal directions while maintaining a state in which the end of the guide lens is positioned to face the incident area of the optical display unit.

As such, as the location of the control unit is adjusted along the planes in the first and second horizontal directions, the location of the image may move in the first horizontal direction in an emission area of the optical display unit.

Further, a side surface of the housing may include a housing guide hole which is extended in a vertical direction crossing the first and second horizontal directions and has a curve, and the control unit may have a control unit protrusion inserted into the housing guide hole.

As the control unit protrusion moves along the housing guide hole, the control unit may pivot and rotate around the incident area of the optical display unit along a plane formed in the vertical direction while maintaining the state in which the end of the guide lens is positioned to face the incident area of the optical display unit.

As such, as the location of the control unit is adjusted along the plane in the vertical direction, the location of the image may move in the vertical direction in the emission area of the optical display unit.

Advantageous Effects

According to the present invention, an electronic device can allow a user to view an optimal image at a more comfortable position by causing the position of an image to be viewed on an optical display unit to be changed.

MODE FOR INVENTION

Figure 1:
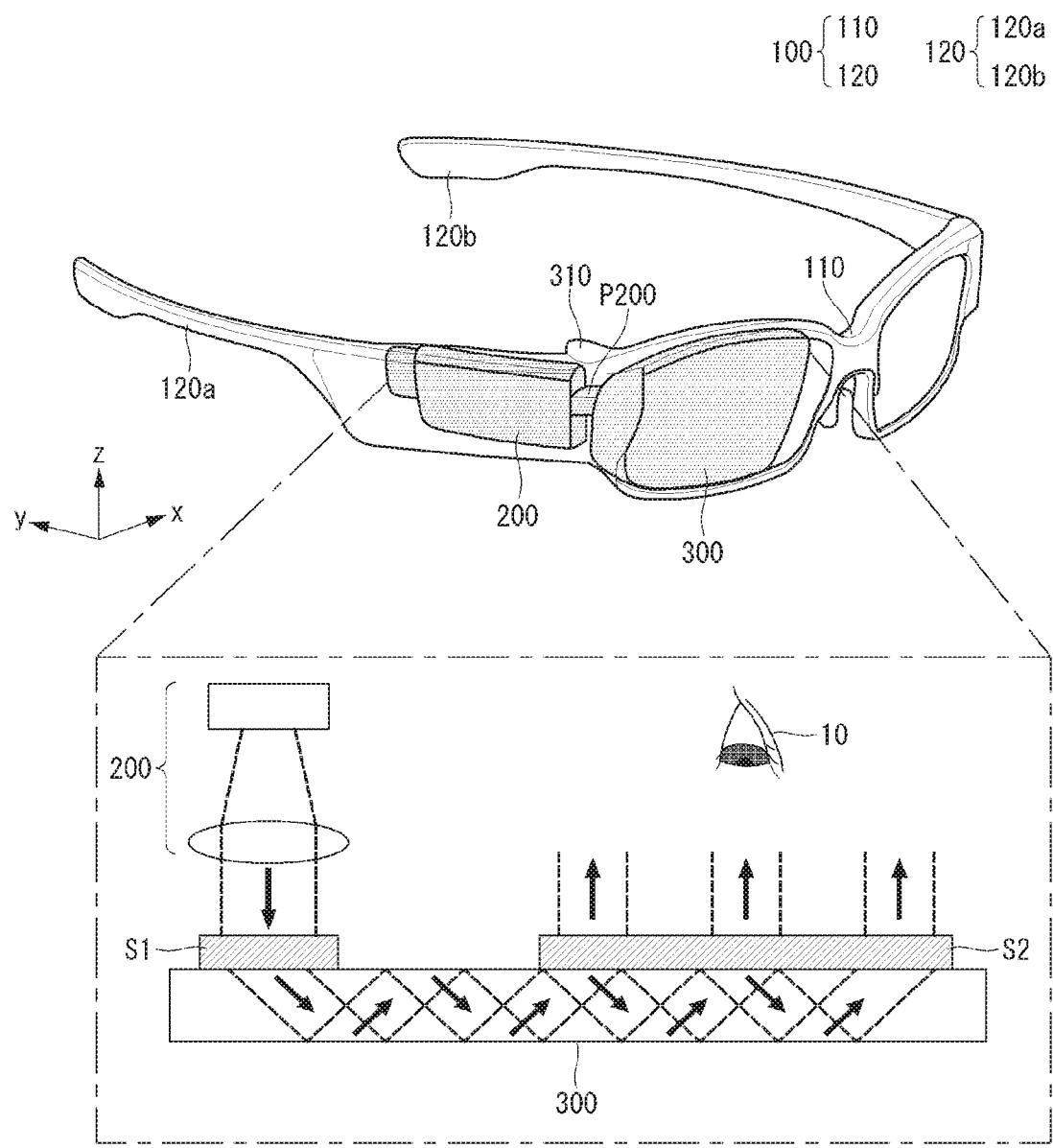
FIG. 1 is a diagram for describing an electronic device according to an example of the present invention.

Hereinafter, exemplary embodiments disclosed in this specification will be described in detail with reference to the accompanying drawings and the same or similar components are denoted by the same reference numerals regardless of a sign of the drawing, and duplicated description thereof will be omitted.

Further, in describing the embodiment disclosed in this specification, a detailed description of related known technologies will be omitted if it is determined that the detailed description makes the gist of the exemplary embodiment disclosed in this specification unclear. Further, it is to be understood that the accompanying drawings are just used for easily understanding the exemplary embodiments disclosed in this specification and a technical spirit disclosed in this specification is not limited by the accompanying drawings and all changes, equivalents, or substitutes included in the spirit and the technical scope of the present invention are included.

FIG. 1 is a diagram for describing an electronic device according to an example of the present invention.

As illustrated in FIG. 1, the electronic device according to an example of the present invention may include a frame 100, a control unit 200, and an optical display unit 300.

As illustrated in FIG. 1, the frame 100 may have a glass form worn on a face in a human body of a user 10, but the present invention is not limited thereto and the frame 100 may have a form such as goggles, etc., which are worn in close contact with the face of the user 10, etc.

The frame 100 may include a front frame 110 and first and second side frames 120.

The front frame may include at least one opening and may extend in a first horizontal direction x and the first and second side frames 120 may extend in a second horizontal direction y crossing the front frame 110 and may extend in parallel to each other.

The control unit 200 may generate an image to be shown to the user 10 or a video in which the images are continued. Such a control unit 200 may include an image source generating the image and a plurality of lenses which diffuses and converges light generated from the image source. As described above, the image generated by the control unit 200 may be emitted to the optical display unit 300 through a guide lens P200 positioned between the control unit 200 and the optical display unit 300. A detailed structure of the control unit 200 will be described in detail in FIG. 2 below.

Such a control unit 200 may be fixed to any one side frame 120 of the first and second side frames 120. As an example, the control unit 200 may be fixed to an inside or an outside of any one side frame 120 or embedded and integrally formed in any one side frame 120.

The optical display unit 300 may serve to show the image generated by the control unit 200 to the user 10 and may be made of a translucent material in order to allow the user 10 to see an external environment through an opening while showing the image to the user 10.

Such an optical display unit 300 may be inserted into or fixed to the opening included in the front frame 110 or positioned a rear surface (i.e., between the opening and the user 10) of the opening to be fixed to and provided in the front frame 110. In the present invention, as an example, a case where the optical display unit 300 is positioned on the rear surface of the opening and fixed to the front frame 110 is illustrated as an example.

As illustrated in FIG. 1, in such an electronic device, when image light for the image is incident on an incident area S1 of the optical display unit 300 by the control unit 200, the image light is emitted to an emission area S2 of the optical display unit 300 to show the image generated by the control unit 200 to the user 10.

As a result, the user 10 may view the image generated by the control unit 200 simultaneously while viewing the external environment through the opening of the frame 100.

Figure 2:
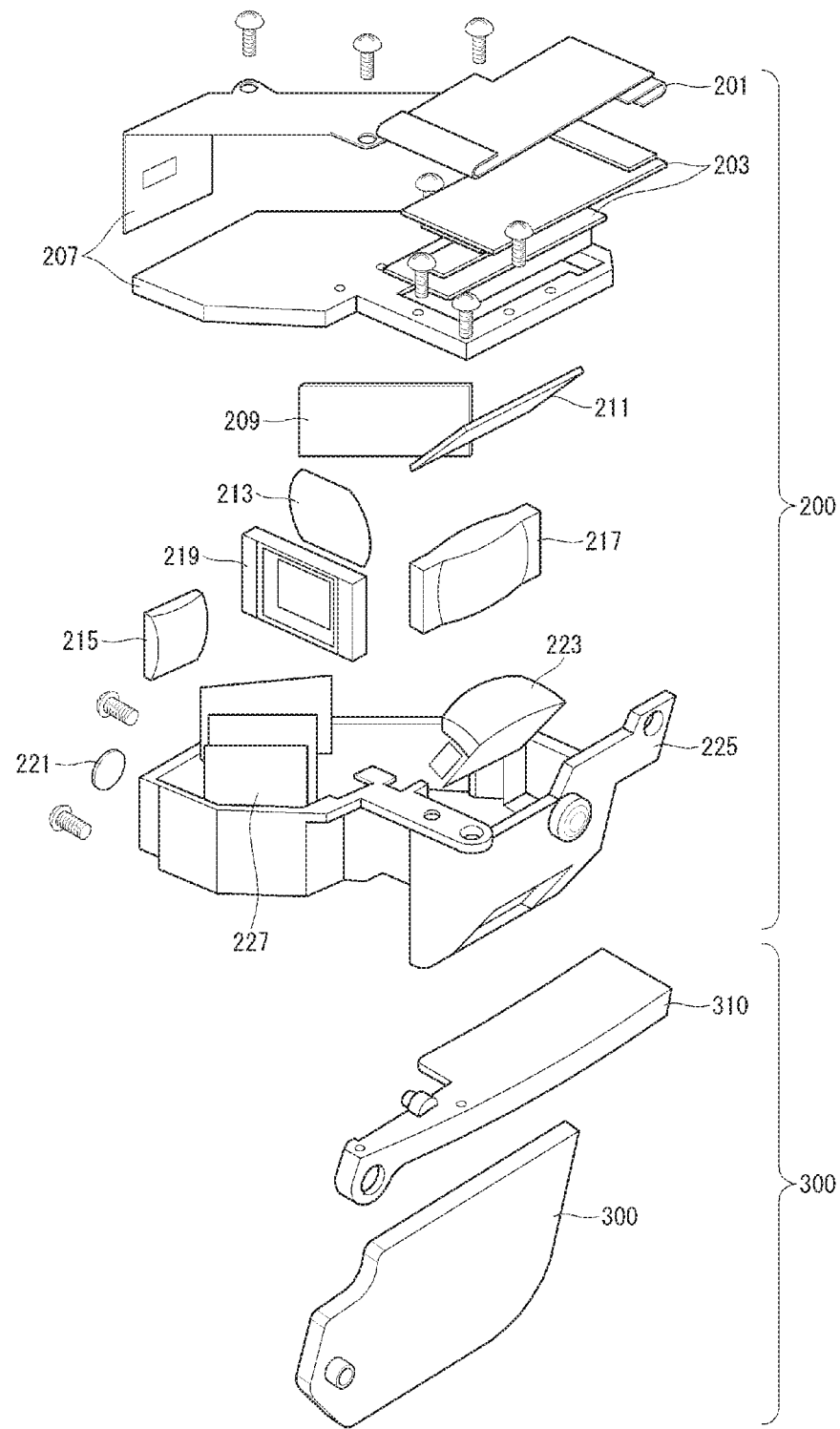
FIG. 2 is a diagram for describing an example of a control unit in FIG. 1.

FIG. 2 is a diagram for describing an example of a control unit 200 in FIG. 1.

As illustrated in FIG. 2, as an example, the control unit 200 may include a first cover 207 and a second cover 225 that protect components inside the control unit 200 and form an outer shape of the control unit 200 and include a driving unit 201, an image source panel 203, a polarizing beam splitter filter (PBSF) 211, a mirror 209, a plurality of lenses 213, 215, 217, and 221, a fly eye lens (FEL) 219, a dichroic filter 227, and a freeform prism projection lens (FPL) 223 inside the first cover 207 and the second cover 225.

The first cover 207 and the second cover 225 may include a space in which the driving unit 201, the image source panel 203, the polarizing beam splitter filter (PBSF) 211, the mirror 209, the plurality of lenses 213, 215, 217, and 221, the fly eye lens (FEL) 219, and the freeform prism projection lens (FPL) 223 may be provided and package the driving unit 201, the image source panel 203, the polarizing beam splitter filter (PBSF) 211, the mirror 209, the plurality of lenses 213, 215, 217, and 221, the fly eye lens (FEL) 219, and the freeform prism projection lens (FPL) 223, which may be fixed to any one side frame 120a or 120b.

The driving unit 201 may supply a driving signal for controlling a video or image displayed on the image source panel 203 and interlock with a separate module driving chip provided inside the control unit 200 or outside the control unit 200. As an example, such a driving unit 201 may be provided in a form of a flexible printed circuits board (FPCB) and the FPCB may include a heatsink that discharges heat generated during driving to the outside.

The image source panel 203 may generate the image and emit light according to the driving signal provided by the driving unit 201. To this end, the image source panel 203 may be any one of a digital light processing (DLP), a digital mirror device (DMD), a liquid crystal on silicon (LCos), a micro crystal (LCD), or a micro Organic Light Emitting Diode (OLED).

The polarizing beam splitter filter (PBSF) 211 may separate the image light for the image generated by the image source panel 203 according to a rotational angle or block some image light or pass other some image light. Therefore, for example, when the image light emitted from the image source panel 203 includes a P wave as horizontal light and an S wave as vertical light, the polarizing beam splitter filter (PBSF) 211 may separate the P wave and the S wave into different paths or pass any one image light and block the other one image light. As an example, the polarizing beam splitter filter (PBSF) 211 may be provided as a cube type or a plate type.

The polarizing beam splitter filter (PBSF) 211 provided as the cube type may filter the image light formed by the P wave and the S wave and separate the filtered image light into different paths and the polarizing beam splitter filter (PBSF) 211 provided as the plate type may pass any one image light of the P wave and the S wave and block the other one image light.

The mirror 209 may reflect the image light polarized and separated by the polarizing beam splitter filter (PBSF) 211 and collect the reflected image light and make the collected image light be incident in the plurality of lenses 213, 215, 217, and 221.

The plurality of lenses 213, 215, 217, and 221 may include a convex lens and a concave lens and as an example, may include an I type lens and a C type lens. The plurality of lenses 213, 215, 217, and 221 repeatedly diffuses and converges the incident image light to enhance straightness of the image light.

The fly eye lens (FEL) 219 may receive the image light passing through the plurality of lenses 213, 215, 217, and 221 and emit the image light so that illuminance uniformity is more enhanced and extend an area where the image light having uniform illuminance.

The dichroic filter 227 may include a plurality of film layers or lens layers and the dichroic filter 227 may transmit light of a specific wavelength band of the image light incident from the fly eye lens 219, reflect light of the remaining specific wavelength band to correct a color sense of the image light. The image light that transmits the dichroic filter 227 may be emitted through the freeform projection prism projection lens 223. In such a control unit 200, respective components in the control unit 200 may be formed as one module by the first cover 207 and the second cover 225.

The optical display unit 300 may receive the image light emitted from the control unit 200 and emit the image incident in a direction in which an eye of the user 10 is positioned so that the user 10 views the incident image light with an eye thereof.

The optical display unit 300 may be fixed to the front frame 110 through a separate fixation member or fixed into the opening provided in the front frame 110.

Hereinafter, in FIGS. 3 to 6, various forms of the optical display unit 300 and various schemes in which the incident image light is emitted will be described.

Figure 3:
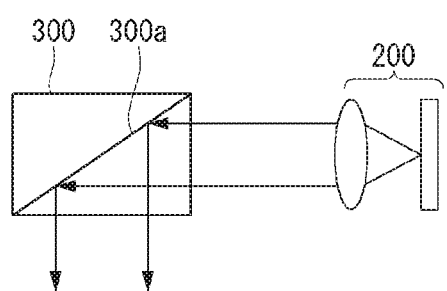
FIGS. 3 to 5 are diagrams for describing various display schemes applicable to an optical display unit according to an example of the present invention.
Figure 3:
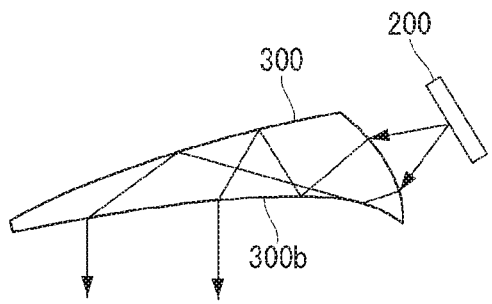
Figure 3:
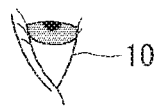
Figure 3:
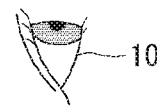
Figure 4:
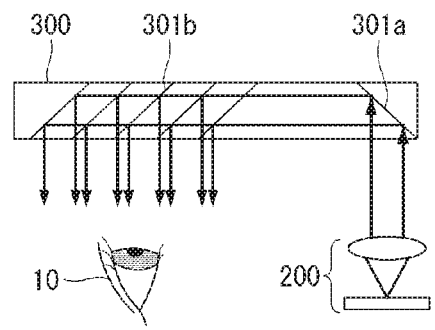
Figure 4:
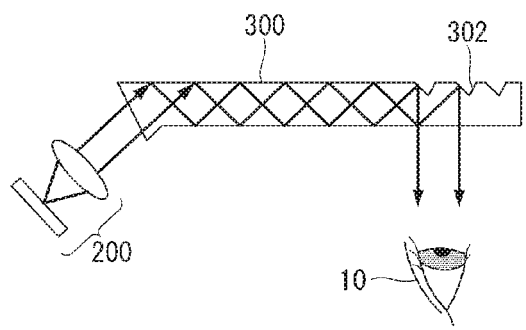
Figure 4:
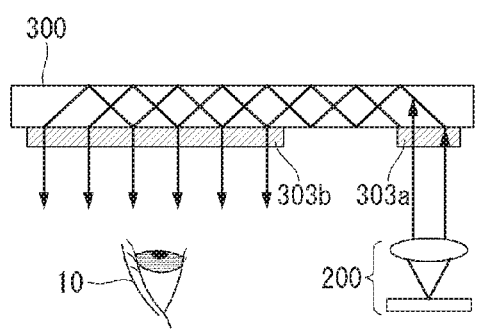
Figure 4:
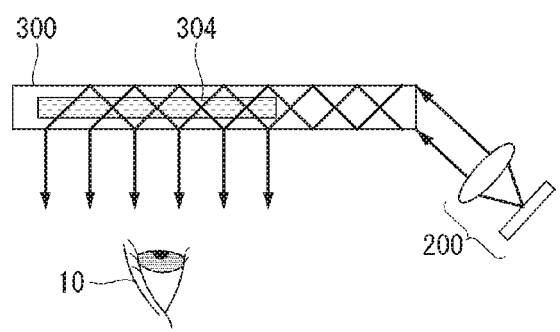
Figure 4:
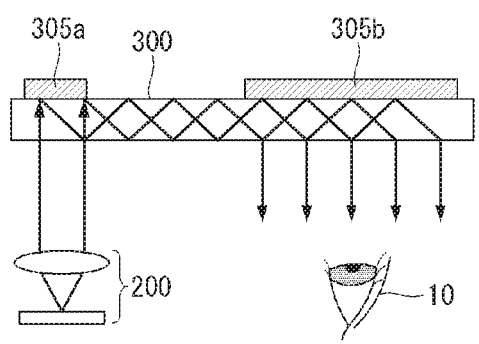
Figure 4:
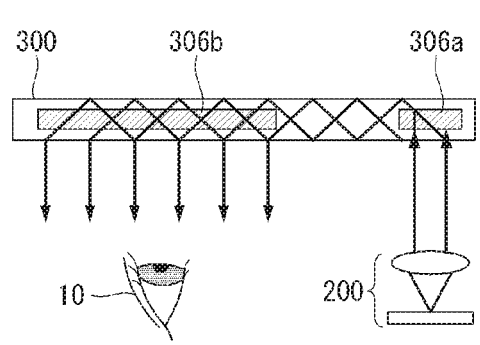
Figure 5:
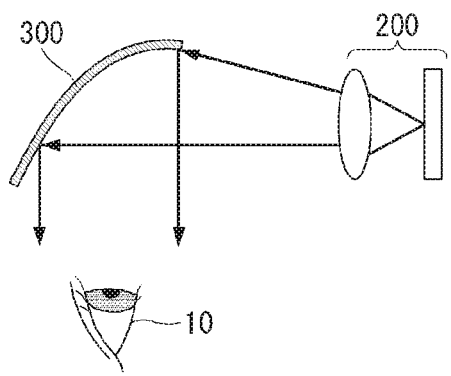
Figure 5:
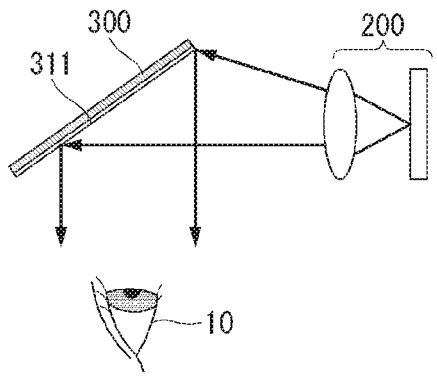
Figure 5:
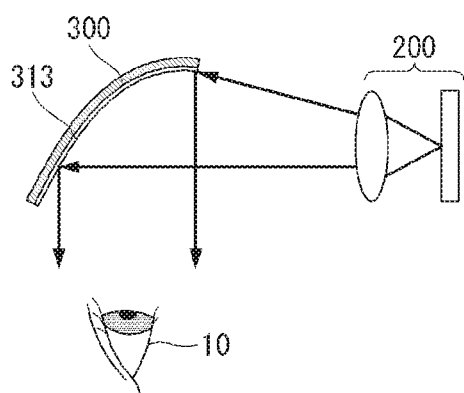

FIGS. 3 to 5 are diagrams for describing various display schemes applicable to an optical display unit 300 according to an example of the present invention.

More specifically, FIG. 3 is a diagram for describing an example of a prism type optical element applicable to an optical display unit 300 according to an example of the present invention, FIG. 4 is a diagram for describing an example of a waveguide type optical element applicable to an optical display unit 300 according to an example of the present invention, and FIG. 5 is a diagram for describing an example of a surface reflection type optical element applicable to an optical display unit 300 according to an example of the present invention.

The optical display unit 300 according to an example of the present invention may be translucent so as for the user 10 to visually recognize the external environment and recognize the image generated by the control unit 200 and as an example, may be formed as an optical element including a material such as the glasses.

As the optical element applicable to the optical display unit 300 according to an example of the present invention, the optical elements illustrated in FIGS. 3 to 5 may be used and besides, optical elements of various schemes including a retina scanning scheme, etc., may be used.

As illustrated in FIG. 3, the prism type optical element may be used in the optical display unit 300 according to an example of the present invention.

As an example, as illustrated in FIG. 3(*a*), as the prism type optical element, a flat type glass optical element may be used in which a surface on which the image light is incident and a surface from which the image light is emitted are flat or as illustrated in FIG. 3(*b*), a freeform glass optical element may be used in which a surface 300*b* from which the image light is emitted is formed by a curved surface.

The flat type glass optical element may receive the image light generated by the control unit 200 on a flat side surface and reflect the incident image light through a total reflection mirror 300*a* provided therein, and emit the reflected image light toward the user 10. Here, the total reflection mirror 300*a* provided in the flat type glass optical element may be formed in the flat type glass optical element by a laser.

The freeform glass optical element is configured in such a manner that a thickness decreases as a distance from the incident surface increases to receive the image light generated by the control unit 200 through a side surface having the curved surface and totally reflect the received image light therein, and emit the totally reflected image light toward the user 10.

As illustrated in FIG. 4, a waveguide type optical element or a light guide optical element (LOE) may be used in the optical display unit 300 according to an example of the present invention.

As an example, the waveguide or light guide type optical element may include a segmented beam splitter type glass optical element illustrated in FIG. 4(*a*), a sawtooth prism type glass optical element illustrated in FIG. 4(*b*), a glass optical element having a diffractive optical element (DOE) illustrated in FIG. 4(*c*), a glass optical element having a hologram optical element (HOE) illustrated in FIG. 4(*d*), a glass optical element having a passive grating illustrated in FIG. 4(*e*), and a glass optical element having an active grating illustrated in FIG. 4(*f*).

The segmented beam splitter type glass optical element illustrated in FIG. 4(*a*) may include a total reflection mirror 301*a* at a side on which an optical image is incident and a segmented beam splitter 301*b* at a side from which the optical image is emitted, in the glass optical element as illustrated in FIG. 4(*a*).

As a result, the optical image generated by the control unit 200 is totally reflected by the total reflection mirror 301*a* in the glass optical element, the totally reflected optical image is guided in a longitudinal direction of the glass and partially separated and emitted by the segmented reflection mirror 301*b* to be recognized by a vision of the user 10.

In the sawtooth prism type glass optical element illustrated in FIG. 4(*b*), the image light of the control unit 200 is incident on a side surface of the glass in a diagonal direction and totally reflected in the glass and emitted to the outside of the glass by a sawtooth shaped concavity and convexity 302 provided at a side to which the optical image is emitted to be recognized by the vision of the user 10.

In the glass optical element having the diffractive optical element (DOE) illustrated in FIG. 4(*c*), a first diffractive unit 303*a* may be provided on a surface on which the optical image is incident and a second diffractive unit 303*b* may be provided on a surface from which the optical image is emitted. The first and second diffractive units 303*a* and 303*b* may be provided in a form in which a specific pattern is patterned or a separate diffractive film is attached onto the surface of the glass.

As a result, the optical image generated by the control unit 200 is diffracted while being incident, totally reflected, and guided in the longitudinal direction of the glass through the first diffractive unit 303a and emitted through the second diffractive unit 303b to be recognized by the vision of the user 10.

In the glass optical element having the hologram optical element (HOE) illustrated in FIG. 4(d), an out-coupler 304 may be provided in a glass at the side from which the optical image is emitted. As a result, the optical image is incident from the control unit 200 in the diagonal direction through the side surface of the glass, totally reflected and guided in the longitudinal direction of the glass, and emitted by the out-coupler 304 to be recognized by the vision of the user 10. A structure of the hologram optical element may be changed little by little and subdivided into a structure having the passive grating and a structure having the active grating.

The glass optical element having the passive grating illustrated in FIG. 4(e) may include an in-coupler 305a provided on a surface opposite to the side on which the optical image is incident and an out-coupler 305b provided on a surface opposite to the glass surface from which the optical image is emitted. Here, the in-coupler 305a and the out-coupler 305b may be provided in a film form having the passive grating.

As a result, the optical image incident on the glass surface at the side of the glass on which the optical image is incident is totally reflected and guided in the longitudinal direction of the glass by the in-coupler 305a provided on the opposite surface and emitted through the opposite surface of the glass by the out-coupler 305b to be recognized by the vision of the user 10.

The glass optical element having the active grating illustrated in FIG. 4(f) may include an in-coupler 306a formed as the active grating in the glass at the side on which the optical image is incident and an out-coupler 306b formed as the active grating in the glass at the side from which the optical image is emitted.

As a result, the optical image incident on the glass is totally reflected and guided in the longitudinal direction of the glass by the in-coupler 306a and emitted to the outside of the glass by the out-coupler 306b to be recognized by the vision of the user 10.

As the surface reflection type optical element applicable to the optical display unit 300 according to an example of the present invention, a freeform combiner type illustrated in FIG. 5(a), a flat HOE type illustrated in FIG. 5(b), and a freeform HOE type illustrated in FIG. 5(c) may be used.

As the freeform combiner type surface reflection type optical element illustrated in FIG. 5(a), in order to serve as a combiner, a freeform combiner glass 300 may be used in which a plurality of flat surfaces having different incident angles of the optical image is formed as one glass 300 and formed to have the curved surface as a whole. In the freeform combiner glass 300, the incident angle of the optical image may be incident differently for each area and emitted to the user 10.

In the flat HOE type surface reflection type optical element illustrated in FIG. 5(b), a hologram optical element (HOE) 311 may be provided to coated or patterned on the surface of the flat glass and the optical image incident by the control unit 200 is reflected on the surface of the glass through the hologram optical element 311 and emitted toward the user 10 through the hologram optical element 311 again.

In the freeform HOE type surface reflection type optical element illustrated in FIG. 5(c), a hologram optical element (HOE) 313 may be provided to be coated or patterned on the surface of a freeform-shaped glass and an operation principle may be the same as that described in FIG. 5(b).

As described above, in the optical display unit 300 according to an example of the present invention, one of the prism type optical element, the waveguide type optical element, the optical guide optical element (LOE), or the surface reflection type optical element may be selected and used.

The control unit 200 may have a structure in which the location of the control unit 200 is finely adjusted so that the location of the image provided from the control unit 200 and shown on the optical display unit 300 is changed.

More specifically, the control unit 200 may have a structure in which the location of the control unit 200 finely rotates in a horizontal direction or a vertical direction z based on incident areas S1 of the optical display unit 300 so that the location of the optical image shown to emission areas S2 of the optical display unit 300 is changed. In this regard, the structure of the control unit 200 is more specifically described below.

Figure 6:
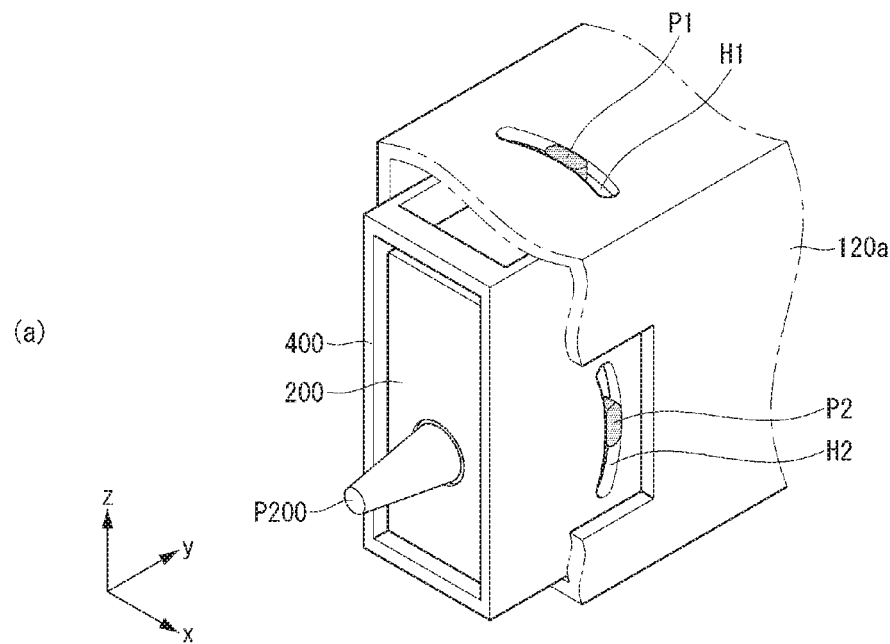
FIG. 6(a) is a partial perspective view of a control unit in order to describing a control unit according to an example of the present invention and FIG. 6(b) more specifically illustrates a connection structure of the control unit and an optical display unit.
Figure 6:
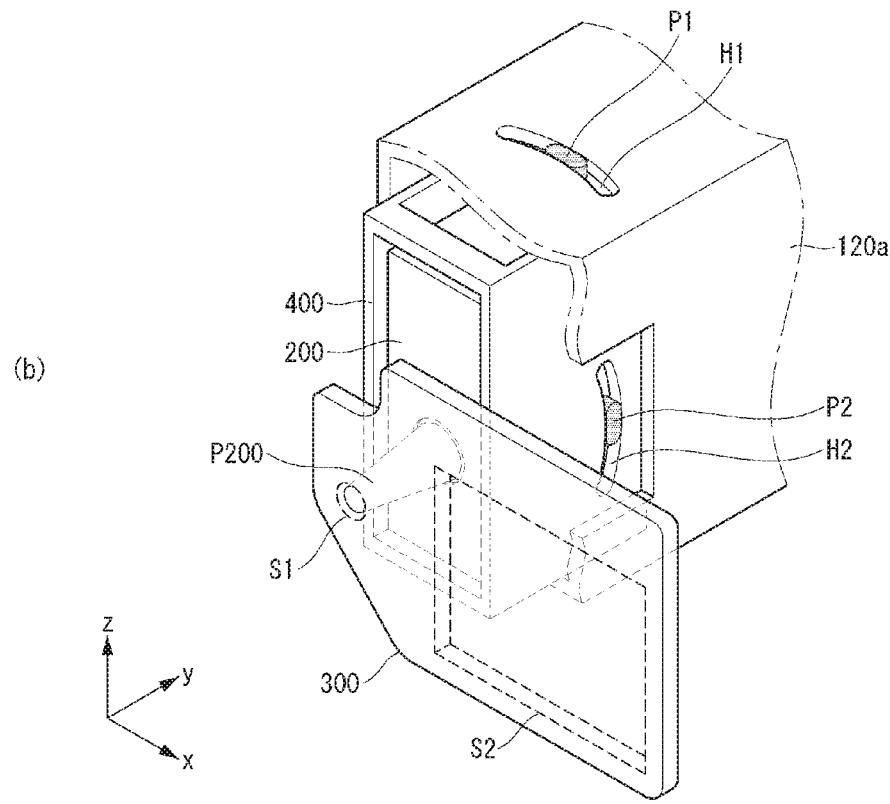
Figure 7:
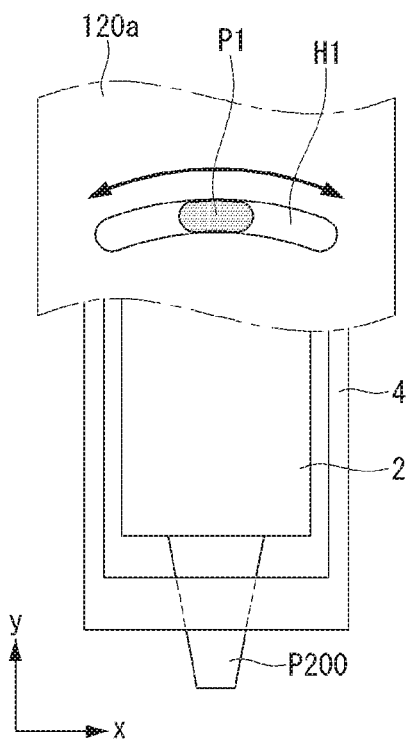
FIG. 7(a) illustrates a view of the control unit illustrated in FIG. 6 from the top and FIG. 7(b) illustrates a side view of the control unit illustrated in FIG. 6.
Figure 7:
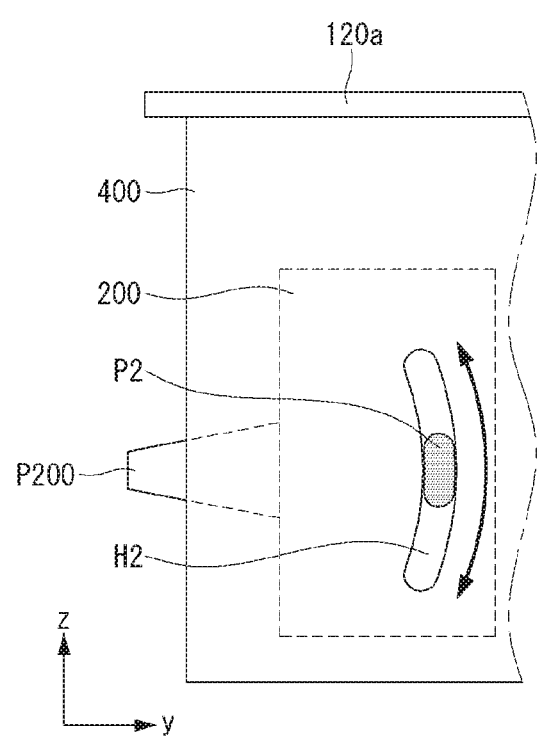

FIG. 6(a) is a partial perspective view of a control unit 200 in order to describing a control unit 200 according to an example of the present invention and FIG. 6(b) more specifically illustrates a connection structure of the control unit 200 and an optical display unit 300 and FIG. 7(a) illustrates a view of the control unit 200 illustrated in FIG. 6 from the top and FIG. 7(b) illustrates a side view of the control unit 200 illustrated in FIG. 6.

In FIG. 6 later, a case where a guide lens P200 transferring the image in the control unit 200 to the optical display unit 300 is provided is illustrated as an example, but this is an example and the present invention is not particularly limited only to the case where the guide lens P200 is provided and the guide lens P200 may be omitted. However, hereinafter, the case where the guide lens P200 will be described as an example.

Such a guide lens P200 may be positioned to face the incident area S1 of the optical display unit 300.

Moreover, in FIG. 6 and subsequent figures, a case where the control unit 200 is embedded in any one side frame 120a and integrally formed will be described as an example.

As illustrated in FIG. 6(a), in any one side frame 120a, a housing 400 and the control unit 200 may be provided in any one side frame 120a and in the control unit 200, as described in FIG. 2, respective components in the control unit 200 may be formed as one module by the first cover 207 and the second cover 225.

As illustrated in FIG. 6(b), the guide lens P200 may be provided between the control unit 200 and the optical display unit 300. The guide lens P200 may emit the image generated by the control unit 200 to the optical display unit 300 and to this end, the end of the guide lens P200 may be positioned to face the incident area S1 of the optical display unit 300.

Any one side frame 120a may have a space in which the control unit 200 is provided, and a frame guide hole H1 may be provided at an upper portion of a space (or a space at which the housing 400 is positioned) in any one side frame 120a.

The frame guide hole H1 may have a curve formed on planes in the first and second horizontal direction x and y. As an example, respective portions constituting the curve of the frame guide hole H1 may have the same length from the end of the guide lens P200 as illustrated in FIG. 7(a).

The housing 400 may have the control unit therein and may be positioned in any one side frame 120a. The housing 400 may have a hexagonal shape with a predetermined thickness, but the shape of the housing 400 is not particularly limited to such a shape.

A housing protrusion P1 inserted into the frame guide hole H1 may be provided at the upper portion of the housing 400.

Such a housing protrusion P1 may be integrally provided at the upper portion of the housing 400 and as the housing protrusion P1 moves, the location of the housing 400 may also be finely adjusted, and as a result, when the housing protrusion P1 is inserted into the frame guide hole H1 and thus moves automatically or by the operation of the user along the frame guide hole H1, the location of the housing 400 may also be finely adjusted along the planes in the first and second horizontal direction x and y.

As such, as the housing protrusion P1 moves along the frame guide hole H1, the control unit 200 may pivot and rotate around the incident area S1 of the optical display unit 300 along the planes formed by the first and second horizontal directions x and y while maintaining a state in which the end of the guide lens P200 is positioned to face the incident area S1 of the optical display unit 300.

Alternatively, when there is no guide lens P200, while the image emitted from the control unit 200 is maintained to be incident on the incident area S1 of the optical display unit 300, the control unit 200 including the housing 400 may pivot and rotate along the planes in the first and second horizontal direction x and y around the incident area S1 of the optical display unit 300.

As a result, an angle at which the image emitted from the control unit 200 is incident on the incident area S1 of the optical display unit 300 may be adjusted along the planes in the first and second directions x and y and the location of the image emitted to the emission area S2 of the optical display unit 300 may be adjusted in the horizontal direction.

Further, a housing guide hole H2 which elongates with the curve in a vertical direction z crossing the first and second horizontal directions x and y may be provided on the side surface of the housing 400 and the control unit 200 may have a control unit protrusion P2 inserted into the housing guide hole H2 may be provided on the side surface of the control unit 200.

Here, in the control unit 200, as described above, respective components in the control unit 200 may be formed as one module by the first cover 207 and the second cover 225 and the control unit 200 formed by one module may be provided integrally with the control unit protrusion P2.

As a result, the when the control unit protrusion P2 is inserted into the housing guide hole H2 and thus moves automatically or by the operation of the user along the housing guide hole H2, the location of the control unit 200 may also be finely adjusted.

As a result, as the control unit protrusion P2 moves along the frame guide hole H2, the control unit 200 may pivot and rotate around the incident area S1 of the optical display unit 300 along the plane formed in the vertical direction z while maintaining the state in which the end of the guide lens P200 is positioned to face the incident area S1 of the optical display unit 300.

Alternatively, when there is no guide lens P200, while the image emitted from the control unit 200 is maintained to be incident on the incident area S1 of the optical display unit 300, the control unit 200 including the housing 400 may pivot and rotate along the plane in the vertical direction z around the incident area S1 of the optical display unit 300, due to the control unit protrusion P2 and the housing guide hole H2.

As a result, an angle at which the image emitted from the control unit 200 is incident on the incident area S1 of the optical display unit 300 may be adjusted along the plane in the vertical direction z and the location of the image emitted to the emission area S2 of the optical display unit 300 may be adjusted in the vertical direction z.

Hereinafter, a detailed example in which the image generated by the control unit 200 is adjusted along the planes in the vertical direction z and the horizontal directions of the optical display unit 300 by fine adjustment of the location of the control unit 200 will be described.

Figure 8:
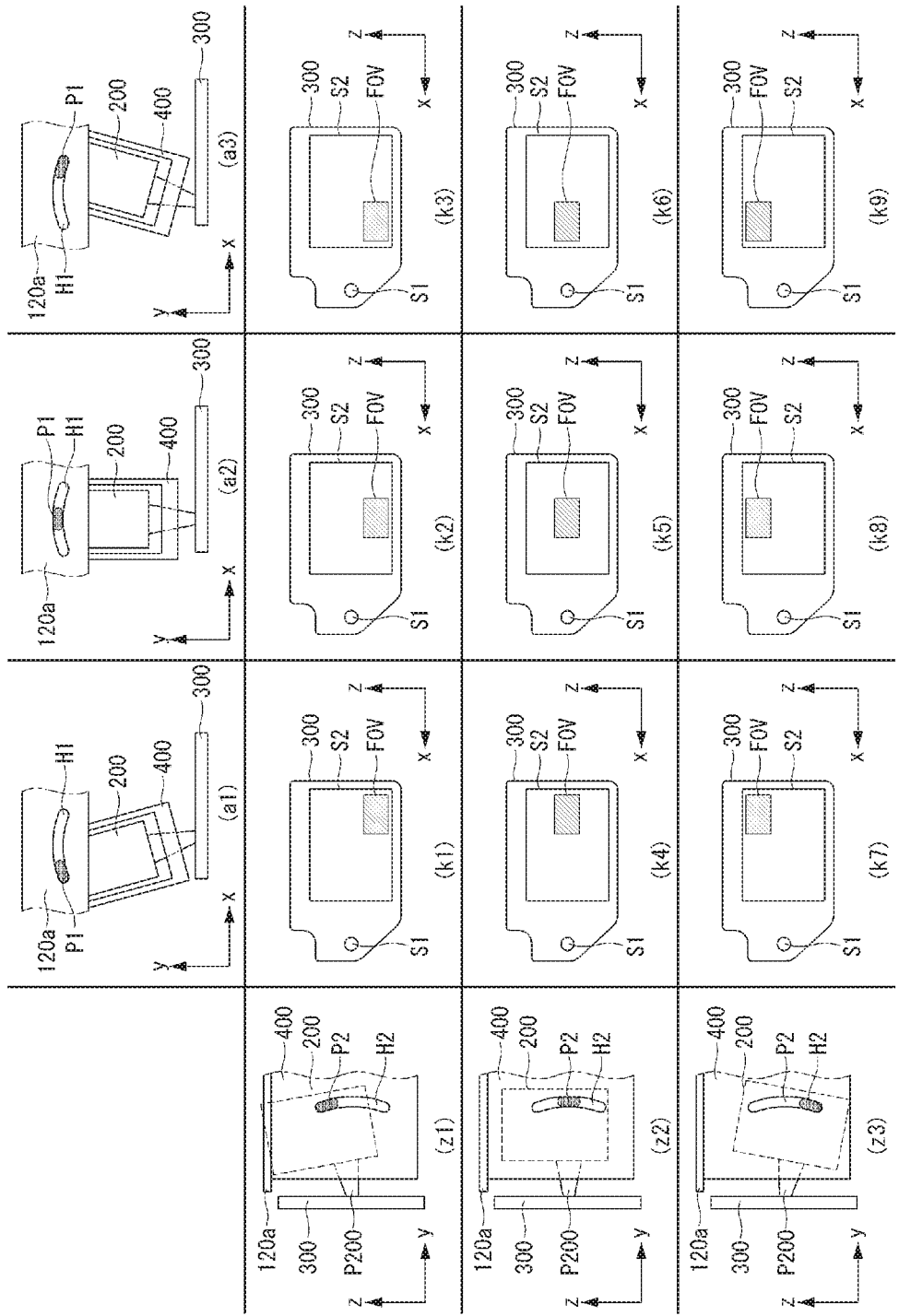
FIG. 8 is a diagram for describing a location of a changed image on an optical display unit by finely adjusting the control unit illustrated in FIG. 6.

FIG. 8 is a diagram for describing a location of a changed image (FOV) on an optical display unit 300 by finely adjusting the control unit illustrated in FIG. 6.

In FIG. 8, a1, a2, and a3 illustrate an example in which the housing protrusion P1 positioned at the upper portion of the housing 400 moves along the frame guide hole H1 provided in any one side frame 120a and in FIG. 8, z1, z2, and z3 illustrate an example in which the control unit protrusion P2 of the control unit 200 moves along the housing guide hole H2 provided in the housing 400.

Moreover, k1 to k9 illustrate an example in which when the location of the control unit 200 is finely adjusted along a1 to a3 and z1 to z3, the location of the image (field of view (FOV)) is changed on the emission area S2 of the optical display unit 300.

As an example, as shown in a1 to a3, as the housing protrusion P1 moves along the frame guide hole H1, the control unit 200 pivots and rotates along the planes in the first and second directions x and y, and as a result, the image (FOV) displayed in the emission area S2 of the optical display unit 300 moves in the first horizontal direction x as shown in k1 to k9 and the location may be changed, and as a result, visual information may be more conveniently provided to the user.

Further, as shown in z1 to z3, as the control unit protrusion P2 moves along the housing guide hole H2, the control unit 200 pivots and rotates along the plane in the vertical direction z, and as a result, the image (FOV) displayed in the emission area S2 of the optical display unit 300 moves in the vertical direction z as shown in k1 to k9 and the location may be changed, and as a result, the visual information may be more conveniently provided to the user.

Moreover, as such, by finely adjusting the control unit 200 in the vertical direction z and the horizontal directions, the image (FOV) may be positioned at a location where the user visually feels convenience in the emission area S2 of the optical display unit 300, thereby providing more convenient visual information to the user.

While this invention has been described in connection with what is presently considered to be practical example embodiments, it is to be understood that the invention is not limited to the disclosed embodiments, but, on the contrary, is intended to cover various modifications and equivalent arrangements included within the spirit and scope of the appended claims.

What is claimed is:
1. An electronic device comprising:
a frame including at least one opening;
a control unit fixed to the frame and configured to generate an image; and
an optical display unit positioned at the opening of the frame and including an incident area for receiving the image from the control unit and an emission area for emitting the received image,
wherein the frame includes:

a front frame including the at least one opening and extending in a first horizontal direction, and first and second side frames which are extended in a second horizontal direction crossing the front frame and are fixed at both ends of the front frame, the first and second side frames being parallel to each other, and wherein the control unit is located in any one of the first or second side frames, pivotally rotated based on the incident area of the optical display unit and configured to adjust an angle at which the image received from the control unit is incident on the incident area of the optical display unit so that a location of the image received from the control unit and shown on the optical display unit is changed.

2. The electronic device of claim 1, wherein the control unit includes a guide lens for transferring the generated image to the optical display unit, and wherein the incident area is positioned to face an end of the guide lens.

3. The electronic device of claim 2, wherein an upper portion of the any one of the first or second side frames at which the control unit is located includes a frame guide hole which is extended in the first horizontal direction and has a curve.

4. The electronic device of claim 3, wherein a housing in which the control unit is embedded is provided in the any one of the first or second side frames at which the control unit is located, and wherein the housing has a housing protrusion inserted into the frame guide hole.

5. The electronic device of claim 4, wherein as the housing protrusion moves along the frame guide hole, the control unit pivots and rotates around the incident area of the optical display unit along planes formed in the first and second horizontal directions while maintaining a state in which the end of the guide lens is positioned to face the incident area of the optical display unit.

6. The electronic device of claim 5, wherein as the location of the control unit is adjusted along the planes in the first and second horizontal directions, the location of the image moves in the first horizontal direction in an emission area of the optical display unit.

7. The electronic device of claim 4, wherein a side surface of the housing include a housing guide hole which is extended in a vertical direction crossing the first and second horizontal directions and has the curve, and wherein the control unit has a control unit protrusion inserted into the housing guide hole.

8. The electronic device of claim 7, wherein as the control unit protrusion moves along the housing guide hole, the control unit pivots and rotates around the incident area of the optical display unit along a plane formed in the vertical direction while maintaining a state in which the end of the guide lens is positioned to face the incident area of the optical display unit.

9. The electronic device of claim 8, wherein as the location of the control unit is adjusted along the plane in the vertical direction, the location of the image moves in the vertical direction in the emission area of the optical display unit.

* * * * *